Sept. 15, 1953 G. B. HODGSON 2,651,913
GAS TURBINE COMBUSTION CHAMBER
Filed March 13, 1951 3 Sheets-Sheet 1
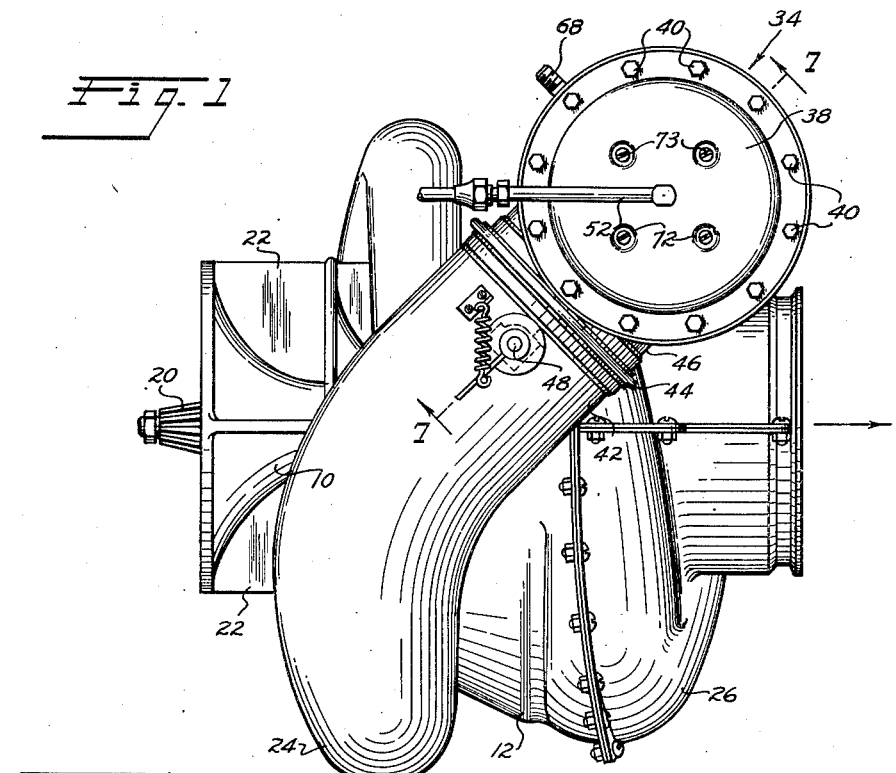
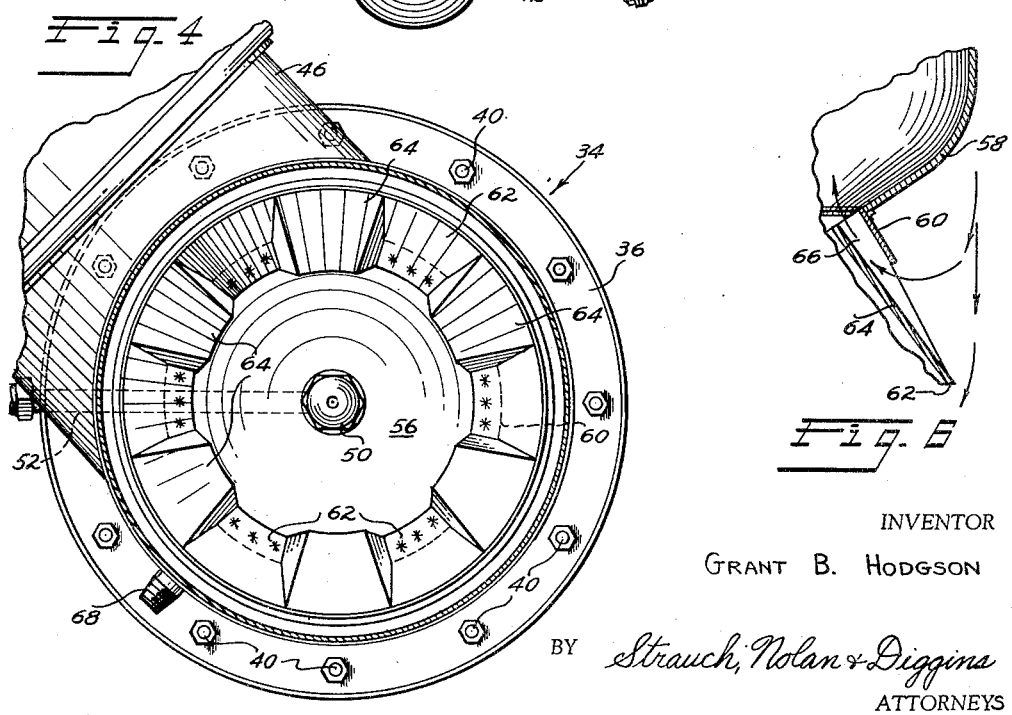
INVENTOR
GRANT B. HODGSON
BY Strauch, Nolan & Diggins
ATTORNEYS

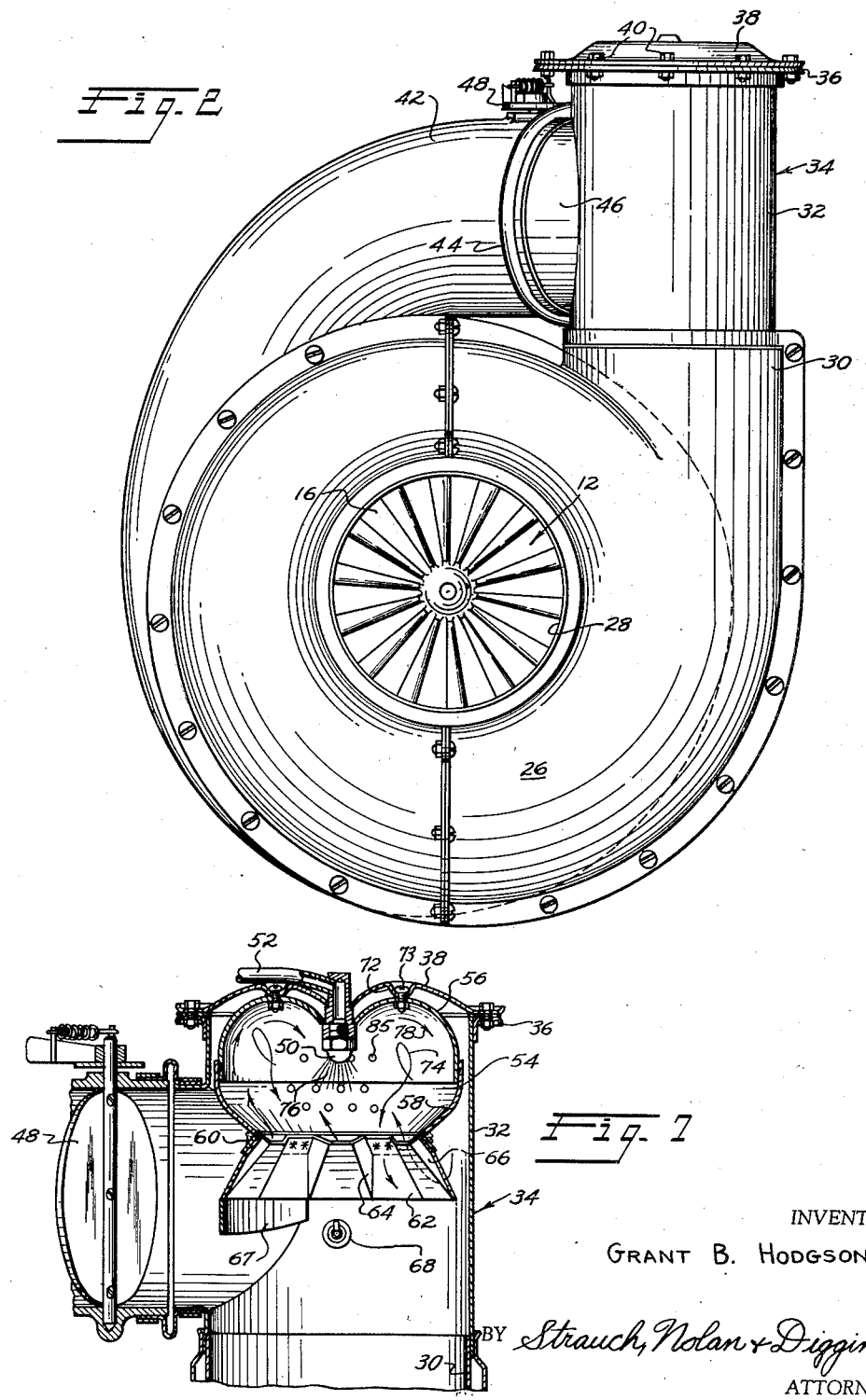

Sept. 15, 1953   G. B. HODGSON   2,651,913
GAS TURBINE COMBUSTION CHAMBER
Filed March 13, 1951   3 Sheets-Sheet 3

INVENTOR
GRANT B. HODGSON
BY Strauch, Nolan & Diggins
ATTORNEYS

Patented Sept. 15, 1953

2,651,913

UNITED STATES PATENT OFFICE 2,651,913

GAS TURBINE COMBUSTION CHAMBER

Grant B. Hodgson, San Diego, Calif., assignor to Solar Aircraft Company, San Diego, Calif., a corporation of California Application March 13, 1951, Serial No. 215,298

14 Claims. (Cl. 60—39.74)

The present invention relates to combustion chambers and more particularly to a novel turbine power plant combustion chamber of unique configuration and construction adapted to permit an extremely close coupling of the compressor and turbine and nesting of the combustion chamber to assure an extremely compact turbine power plant unit.

In connection with the widely expanding adoption of turbo-compressor power plants, it has be-become highly desirable for certain uses to provide a very compact, small dimensional high capacity compressor-turbine power plant for installation in comparatively restricted areas. A typical example of this need is disclosed in the application of Leon R. Wosika and Arsham D. Zakarian, Serial No. 216,282, executed on even date herewith and entitled "Pump and Power Plant Assembly," owned by the assignee of this application and filed March 19, 1951. Of course, in a power plant of this kind, while providing for high capacity operation, the compressor, turbine and combustion chamber structure are severely limited or restricted in their overall dimensions. The conventional combustion chamber of usual turbo-compressor power plants, owing to the relatively elongated combustion chamber body structure and the opposed end connections with the compressor and turbine to provide smoothly curving aligned air inlet and gas outlet passages to assure a free unrestricted flow and intimate mixture of the air and fuel, cannot be utilized in such small dimensional power plants. As a consequence, applicant developed the present novel combustion chamber of minimum overall dimensions and high output capacity to satisfy the conditions encountered in the aforesaid power plant and fire pump assembly and similar situations requiring small dimensional, high capacity combustion chambers.

It, accordingly, is a primary object of the present invention to provide a relatively short bodied, side entry combustion chamber arranged to assure efficient flow and intimate mixture of the combustion air and fuel.

It is a further important object of the present invention to provide a short bodied, side entry, combustion chamber with a novel head structure assuring efficient handling and distribution of the combustion air and fuel to produce a highly combustible mixture without a substantial retardation of the free flow of the air to and gases through and out of the combustion chamber.

More specifically, it is an object of the present invention to provide a turbine combustion chamber of generally elbow-like configuration in which the respective ends are adapted to be respectively connected to the compressor scroll outlet and the turbine scroll inlet with the combustion chamber body generally lying in juxtaposition to the adjacent portions of the compressor and turbine scrolls and nested in the angular space provided between the respective scroll outlet and inlet connections.

It is another object of the present invention to provide a combustion chamber of very small dimensions having an air intake connection at the side thereof for connection to the outlet of the scroll of the compressor, together with means for directing and circulating air within the combustion chamber to assure an intimate fuel and air mixture for proper combustion thereof within said chamber.

Another object of the invention is to provide a short bodied combustion chamber which in effect forms a continuation of the inlet end of the turbine scroll, and a closure for the outer end of said chamber carrying a fuel spray nozzle and novel means for directing and circulating the combustion air to obtain an intimate mixture thereof with the fuel spray and produce a highly combustible fuel air mixture and pilot the flame without substantial retardation of the free flow of the air and gases through and out of the combustion chamber.

The present invention has for still another object to provide a novel fuel air mixing means within the combustion chamber embodying a hollow fuel spray receiving head having an outwardly flared, frusto-conical, fluted skirt in co-axial relation to the outlet end of the combustion chamber and through the flutes of which the combustion air is directed in a multiplicity of streams into said hollow head and caused to circulate therein and form an intimate mixture with the fuel spray, to be discharged from said head through the outlet end of the combustion chamber after ignition.

Still another important objective is to provide in conjunction with and as another function of the novel fuel-air mixing device a combustion flame piloting chamber embodying a hollow fuel spray receiving head having an outwardly flared, frusto-conical, fluted skirt in co-axial relation to the outlet end of the combustion chamber and through the flutes of which the combustion air is directed in a multiplicity of streams into said hollow head and caused to circulate therein and form an intimate mixture with the fuel spray, and said hollow head providing a sheltered zone where the combustion is stabilized, which combustion acts to pilot the combustion in the main combustion chamber.

With the above and other objects in view, the invention comprises the improved combustion chamber and the construction and relative arrangement of its several parts as will hereinafter be more fully described, illustrated in the accompanying drawings and subsequently incorporated in the subjoined claims.

In the drawings, wherein I have disclosed one simple and practical embodiment of the invention and in which similar reference characters designate corresponding parts throughout the several views:

Figure 1 is a top plan view illustrating one preferred assembly of the combustion chamber with the compressor and turbine units of a power plant;

Figure 2 is an end elevation of Figure 1;

Figure 4 is a horizontal sectional view on an enlarged scale taken substantially on the line 4—4 of Figure 3;

Figure 6 is a fragmentary vertical sectional view taken substantially along the line 6—6 of Figure 5; and Figure 7 is a fragmentary sectional view of the combustion chamber head taken along the line 7—7 of Figure 1.

Figure 3:
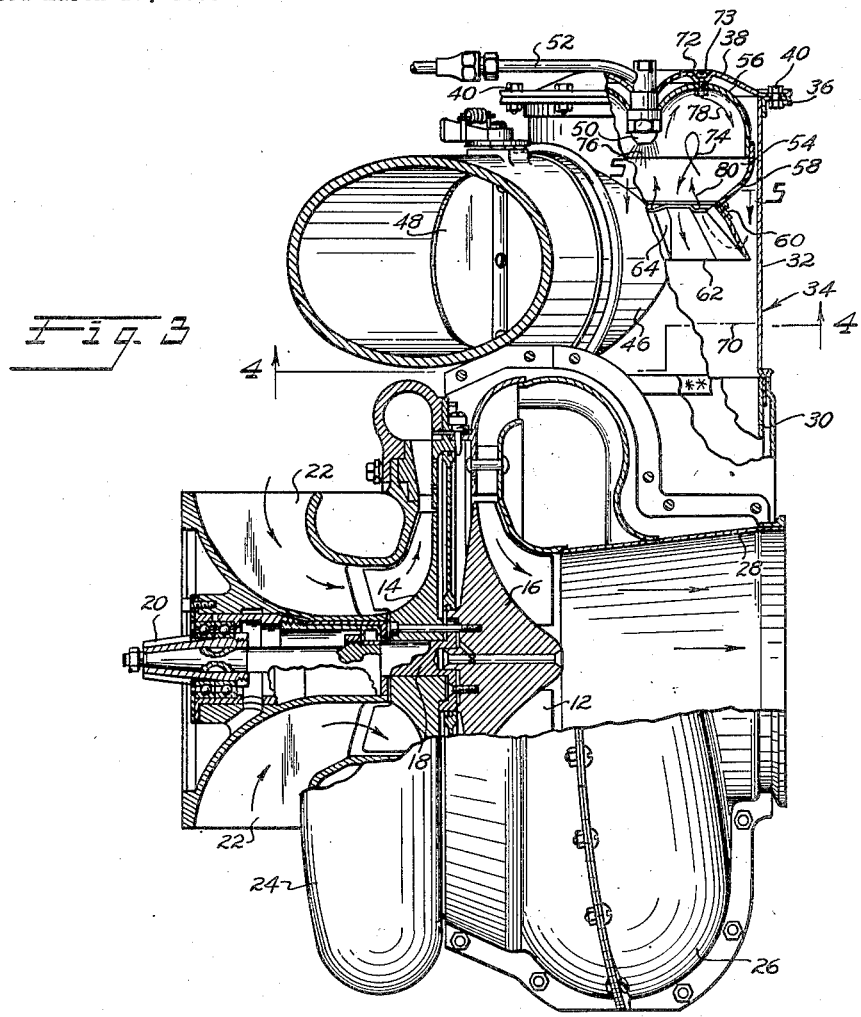
Figure 3 is a side elevation with certain of the parts being shown in section.
Figure 5:
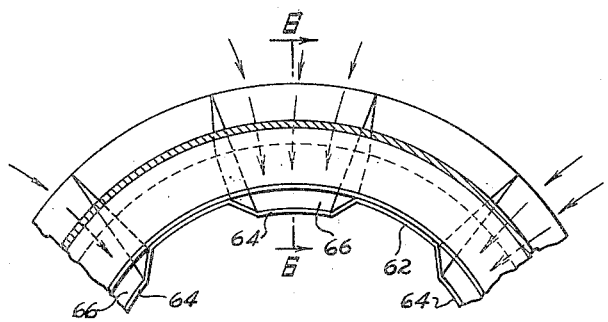
Figure 5 is a fragmentary horizontal sectional view taken along the line 5—5 of Figure 3.

Referring in further detail to the drawings, the power plant as illustrated in Figure 3 thereof, includes a compressor unit 10 and a turbine unit 12, each of the radial flow type mounted in back-to-back relation with their respective scroll outlet and scroll inlet in adjacent closely spaced, right angularly facing position. The compressor rotor 14 and the turbine rotor 16 are rigidly connected by suitable means in back-to-back relation to one end of the turbine shaft 18, the other end of which is provided with a pinion 20 or other suitable power transmitting element through which the turbine shaft may be drivingly coupled with a pump or other apparatus and various accessories for the power plant.

Air enters the compressor through the annularly opening intake passages 22 and is discharged therefrom through a closely coiled compressor scroll 24. The products of combustion, from the combustion chamber to be presently described in further detail, are delivered into the closely coiled turbine scroll 26 of the turbine unit and are discharged from the turbine unit through the axially extending exhaust passage 28 which may be connected with a suitable tail pipe (not shown). Since this compressor turbine assembly is fully described and claimed in the aforementioned co-pending application a more detailed description thereof is not deemed necessary for the purposes of the present application.

As shown in Figure 2 of the drawings, the turbine scroll 26 is provided with a short vertically disposed inlet terminal portion 30. To the end of this scroll terminal 30, the lower end of a cylindrical sheet metal body wall 32 forming the combustion chamber 34 is welded or otherwise rigidly joined. However, if desired, this combustion chamber body wall may be formed as an integral extension of the wall of the scroll terminal 30. In either event the axial dimension of this chamber wall is quite small being of the order of one half the length of the conventional combustion chamber.

A bolting flange 36 is externally welded to the upper end of the combustion chamber wall 32 and to this flange the marginal portion of a sheet metal closure member 38 for the upper end of the combustion chamber is securely bolted as shown at 40.

The outlet end portion 42 of the compressor scroll 24 is angularly extended as shown in Figure 1 and connected by suitable coupling means 44 with an air intake extension 46 provided upon the side of the cylindrical wall 32 of the combustion chamber adjacent to but upstream from its connection with the inlet terminal portion 30 of the turbine scroll 26. In the outlet end 42 of the compressor scroll a butterfly type entrance valve 48 is mounted. Valve 48 is adapted to be closed during cranking or starting of the turbo-compressor power plant to relieve the load on the compressor and turbine. This valve forms no part of the present invention but constitutes the invention of Arsham D. Zakarian more fully described and claimed in a second co-pending application of Arsham D. Zakarian, Ser. No. 215,252, owned by the assignee of this application entitled "Turbine Starting Mechanism" executed and filed on even date herewith.

It will be noted that the body wall 32 of the combustion chamber extends only a short distance above its connection with the outlet end of the compressor scroll 34, said chamber having a lengthwise dimension only slightly exceeding its diameter. A fuel spray nozzle 50 of standard type is centrally welded or otherwise rigidly secured in the reversely dished cover member 38 and supplied with a suitable fuel through a pipe line 52 connected with a source of fuel supply (not shown). The fuel spray is discharged from nozzle 50 in a divergent spray axially of a novel head or combustion flame piloting chamber. This piloting chamber is designed to compensate for the short length of the combustion chamber by utilization of the reversion flow principle for effecting the mixture of the fuel and air and maintaining short flames in the combustion chamber. To this end, this head is formed by a centrally depressed annular, dome-shaped, sheet metal, section 56 welded to the nozzle 50, and opening toward the discharge end of the combustion chamber, a lower annular, sheet metal, section 58 inclined inwardly at an angle of 50° and suitably welded to the lower edge of the section 56, and defining a coaxial opening of a diameter slightly greater than the radius of said body wall 32 and a diverging, fluted skirt 62 inclined outwardly at an angle of 40° These sections 56 and 58 of the mixing chamber 54 are annularly spaced from the body wall 32 of the combustion chamber and to the lower edge of the inwardly inclined section 58 an outwardly flaring rim or flange 60 is securely welded. The inner face of this rim 60 provides a mounting face to which the diverging or outwardly and downwardly inclined, fluted sheet metal skirt 62 is welded. The position and angularity of the skirt are selected so as to form a cone which generally parallels the divergent conical fuel spray from the single centrally disposed nozzle 50. Skirt 62 is formed with a plurality of circumferentially spaced flutes 64 forming air conducting passages 66 of progressively decreasing width and increasing depth from the lower to the upper edge of said skirt.

As clearly seen from Figures 3 and 17 inclined section 58 and fluted skirt 62 project downwardly into the discharge path from the outlet end 42 of compressor scroll 24 to approximately the medial plane thereof. A portion of the air discharging from the outlet end 42, therefore, is intercepted by section 58 and skirt 62 separating the air into upper and lower layers or strata, respectively used as primary combustion air for mixture with the fuel and secondary combustion air. Since the air is discharged from outlet end 42 at high velocity and the upper stratum is projected against annular section 58 and annular skirt 62, the portion of the upper stratum striking section 58 will be divided into two streams flowing in opposite directions around section 58 and the major volume of the lower portion of the upper stratum will flow directly into and through the flute passages 66 facing outlet end 42 to the piloting chamber. The oppositely flowing streams, after encircling section 58, will collide with each other and the chamber wall 32 opposite outlet 42 creating a turbulently flowing body of air on the side of the combustion chamber opposite outlet 42. This turbulent body of air finds a ready escape path through the adjacent flute passages 66 into the piloting chamber and mixes with the remainder of the upper stratum and fuel in a manner to be presently described. The lower stratum of air issuing from outlet 42 impinges on an arcuate tapered deflector 67 secured to the lower edge of skirt 62 adjacent the air inlet and flows into the combustion chamber past the edges and the lower end of deflector 67. The deflector is positioned so as to dispose its region of greatest height directly opposite the center of the air inlet passage and thus balances and divides the flow of air to produce a more uniform flame distribution.

A spark plug or other suitable initial ignition means, indicated at 68 (Figures 2 and 4), is mounted in the wall of the combustion chamber body 32. Igniter 68 is so located with respect to the lower end of skirt 62 that the flame will readily propagate upwardly into the chamber 54 to initiate a substantially toroidal pilot flame as explained below. It is, of course, understood that igniter 68 is energized only during starting since combustion once started is self-sustaining during normal operation of the power plant.

In order to prevent possible distortion of the sheet metal wall 56 by pressures within the chamber 54 and to assure a solid mounting of the piloting chamber and its continued coaxial relation to wall 32, the sheet metal cover member 38 is provided with a number of circumferentially spaced indentations forming semi-spherical protuberences 72, which are held in contact with the outer surface of the sheet metal wall 56 by bolts 73 or other suitable fastening means such as rivets or the like.

The operation of my present invention is as follows: The compressor and turbine rotors 14 and 16 are brought to the required starting speed, with valve 43 closed, by suitable independent power means preferably applied through pinions 20 and the normal driven gear train as disclosed more clearly and in detail in the aforementioned co-pending applications. The starting speed is readily reached due to the unloaded condition of the compressor and turbine rotors caused by the closed condition of valve 48.

Upon attainment of the starting speed, valve 48 is opened allowing compressor unit 10 to operate and force compressed air into the combustion chamber and piloting chamber in the manner previously described. At the same time fuel is supplied to the piloting chamber through nozzle 50 and spark plug 68 is energized. Ignition occurs instantaneously at the spark plug 68 and the combustion flame front progresses rapidly from plane 70 into the flame anchor chamber and mixing chamber 54. The air passing through flute passages 66, due to the progressively decreasing cross-sectional area of the passages, is subject to an increase in velocity and is projected from passages 66 at high velocity through the divergent fuel spray component of nozzle 50 and entrains fuel which has been vaporized by heat from the combustion process in the chamber 52 and begins to burn. Thus the burning fuel-air mixture, due to the directional influence of flutes 64, follows a course indicated by arrows 74 (Figure 3) and impinges on the inner curved surface of dome section 56 around nozzle 50 effectively atomizing any entrained fuel droplets and sweeps over the inner curved surface in a generally radially outward direction as indicated by arrows 78 (Figure 3), entraining the atomized fuel and producing a more intimate mixture simultaneously with the combustion process. Upon reaching the outermost portion of this curved surface, an inward and downward flow direction is given to this rich intimate burning mixture and it passes across the discharge ends of the flute openings 66 through the high velocity incoming air into the main downward component 76 of the fuel spray from nozzle 50.

Thus a toroidal swirl of flame is produced as indicated by the arrows 74 and 78. The flame propagates into this area during the initial phases of operation and once ignited forms the nucleus of the flame pattern which is self-sustaining through a wide range of throttling. The portions of the flow as indicated by the flow arrows 80 revolve more slowly and since they have received less fuel from the initial spray contact may make several circuits before fully maturing and coming to the kindling point. A very substantial stable piloting flame is thus established within the piloting chamber and extending into the combustion chamber and is centered at a point spaced from the wall structure of said chamber.

In passing through the inrushing air and into the main fuel spray, additional air and fuel are picked up and the impact forces of the intersecting streams effect a final commingling of the fuel and air with the pilot flame producing a rich burning mixture in the main combustion chamber body just beyond the plane of the lower end of skirt 62 where the balance of the combustion air is supplied.

As the fuel flow increases, the flame propagates on downwardly from the toroidal swirl and thence through and down the fuel spray cone and into the highly combustible mixture formed beyond the lower end of the skirt in which area the main combustion then occurs.

It will be observed that the skirt 62 and the walls of the mixing chamber 54 will be heated by radiation and convection from the flame front 70 so that the air will be preheated in its passage through flute passages 66 and the chamber 54 and the fuel spray will be heated to insure complete vaporization of the fuel particles, resulting in a more homogeneous combustible mixture.

However, it is to be noted that the combustion chamber head is protected against excessive heating in the outer portion of the relatively cool fuel carrying air, as at 78, which circulates along its inner surface. If desired a plurality of small holes 85 may be provided in the head sections 56 and 58 to provide additional cooling air.

It will be evident that by the provision of a combustion chamber structure of small diameter and short length providing closely adjacent connections for the discharge end of the compressor scroll and the intake end of the turbine scroll, the present invention provides an efficiently operating combustion chamber of minimum overall dimensions. Notwithstanding this close coupling of the combustion chamber structure with the compressor and turbine scrolls, the novel fuel air mixing and piloting means within the combustion chamber assures economical fuel consumption with reliable operation of the power plant at maximum efficiency.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a gas turbine combustion chamber structure comprising a cylinder of substantially uniform diameter having an outlet end adapted for direct connection with and to form a coaxial prolongation of the inlet end of a turbine scroll, a closure head secured on the remote end of said cylinder, and means in the cylinder wall adapted for connection to a source of compressed air: a fuel and air mixing head mounted on said cylinder closure head and comprising an annular rear section having a central inwardly directed depression, a fuel injector in said central depression, a convergent annular wall extending generally axially from the periphery of said annular section, and a fluted divergent skirt the alternate flutes of which form passage means therein for deflecting air in a plurality of streams into head and toward said fuel injector, said air thereby entraining fuel and thereafter flowing successively over said rear section and being discharged in a convergent stream from said convergent section.

2. A combustion chamber cylinder closed at one end and open at its other end, the cylinder wall having an air intake port intermediate its ends; air and fuel mixing means within the closed end of said cylinder comprising a mixing and piloting chamber coaxial with the cylinder wall and spaced therefrom opening at its inner end into the main combustion chamber of said cylinder, a nozzle for delivering a spray of fuel in an axial direction into said mixing chamber and toward the open end, means projecting axially from the open end of said mixing chamber into the path of air entering through said intake port and having substantially unobstructed air deflecting passages substantially coextensive with said means and converging toward said mixing chamber to direct a plurality of axially converging air streams into said chamber through said open end and entrain the fuel spray, said mixing chamber having a closed end wall formed to reverse the flow of the resulting fuel-air mixture and redirect the same counter to said entering air into said main combustion chamber; and means for igniting said fuel-air mixture in the main combustion chamber of said cylinder beyond the open end of the mixing and piloting chamber of said air and fuel mixing means.

3. The combination defined in claim 2, wherein said air deflecting means is secured to the wall of said mixing chamber in circumscribing relation to the open end thereof.

4. The combination defined in claim 2, wherein said flow reversing means comprises a dome-shaped head and said deflecting means comprises an annular outwardly flaring fluted skirt secured to the body wall of said mixing chamber around the open end thereof and providing circumferentially spaced air directing passages converging inwardly toward the axial center of said mixing chamber.

5. A combustion chamber for a turbo-compressor power plant comprising a substantially cylindrical body of relatively short length having a right angularly disposed air inlet pipe connection opening into the interior at a point substantially midway between its ends; a closure cap secured to one end of said body and having a centrally disposed coaxial opening therein; a fuel injection nozzle secured in said cap opening in coaxial discharge relation to said body and adapted to deliver a divergent fuel spray axially of said body; and a mixing head mounted on said fuel injection nozzle in coaxial, peripherally spaced, relation to said body and comprising a substantially dome-shaped metal section secured at its center to said fuel injection nozzle and providing an annularly depressed, radially uniformly curved portion extending from said nozzle to its inner peripheral wall, an inwardly and axially sloping wall section forming an axial continuation of said peripheral wall and defining a throat opening for the passage of air into and fuel-air mixture out of said mixing head, and a divergent skirt extending axially from said throat opening to a plane substantially normal to the axis of said body and disposed approximately in the plane of the intersection of the axis of said air inlet pipe connection with said body, said skirt having outwardly facing, annularly spaced air inlet passages leading to said throat opening for directing air from said inlet pipe connection into said mixing head and through said divergent fuel spray along annularly spaced paths converging toward said nozzle and the center of said annularly depressed portion of said dome-shaped section to thereby entrain fuel and cause the air and entrained fuel to sweep around said depressed portion in contact with the inner wall surfaces in a generally radially outward direction to said inwardly and axially sloping wall section and be directed thereby in an annular converging path through said throat into said body to produce a combustible fuel-air mixture for burning in said body.

6. The combination defined in claim 5, wherein said cap is provided with radially outwardly disposed, annularly spaced, inwardly directed depressions adapted to contact the outer surface of the depressed portion of said dome-shaped metal section to maintain the coaxial relation between said mixing head and said body in spite of the thrust forces resulting from the combustion in said combustion chamber.

7. The combination defined in claim 5, together with igniter means mounted in said body wall downstream from the free end of said divergent skirt to thereby initiate the flame front in a plane downstream from said mixing chamber.

8. The combination defined in claim 5, wherein said divergent skirt is composed of fluted sheet metal, the flutes therein extending in a generally axial direction and being of substantial cross-sectional area and of progressively decreasing transverse dimensions toward the smaller end to provide air inlet passages of decreasing cross-sectional area in a downstream direction.

9. A fuel and air mixing head for a combustion chamber comprising an end section of generally dished shaped cross section and having a central opening; a fuel nozzle secured in fluid tight relation in said central opening; and inwardly and axially extending section secured to the rim of said end section and providing a restricted throat opening; and a divergent skirt portion secured to the free end of said inwardly and axially extending section and having in its external face outwardly opening, annularly spaced passages terminating at said throat opening and adapted to supply air interiorly of said head through said throat opening.

10. The combination defined in claim 9, wherein said skirt portion is formed by a truncated sheet metal cone having axially extending fluting and said passages are formed by a sheet metal ring element welded to the outer surface of said cone over a substantial area of the smaller end only.

11. A fabricated sheet metal combustion chamber for a compressor turbine assembly comprising a cylindrical combustion chamber wall to be connected at one end to the inlet end of a turbine scroll and provided with a side opening between its ends; an inlet pipe connection secured in said opening and adapted for connection to the outlet end of a compressor scroll; an L-shaped sheet metal annulus secured to the other end of said cylindrical combustion chamber wall and forming a radially directed mounting flange; a generally dish-shaped sheet metal closure cap having a peripheral flange matingly abutting said flange of said cylindrical combustion chamber wall and a central opening coaxially disposed with respect to said cylindrical combustion chamber wall; a unitary fuel nozzle and air and fuel mixing head assembly having a portion of said nozzle protruding axially from said head and welded in the opening in said cap to support said nozzle and said mixing head from said cap, said mixing head including a dome-shaped sheet metal section and a plurality of devices spaced about said nozzle and rigidly connecting said head section to said cap; and removable securing means cooperating with said mating flanges to secure said cap and its associated fuel nozzle and mixing head in assembled relation to said cylindrical combustion chamber wall.

12. Combustion chamber structure for gas turbines and the like comprising a main combustion chamber cylinder adapted for connection at one end with the inlet end of a turbine scroll and closed at its other end, said cylinder intermediate of its ends having an air inlet port, a fuel and air mixing head rigidly mounted within the closed end of said cylinder and having a constricted discharge throat coaxial with said cylinder, means for delivering a fuel spray within said mixing head in a diverging axial path, and an air deflecting member within said cylinder directly opposed to said air inlet port and having means for delivering a plurality of air streams into the mixing chamber at the perimeter of said discharge throat in converging axial paths diagonally intersecting the fuel spray to entrain the fuel and form an intimate fuel-air mixture discharging through said throat into the main combustion chamber.

13. Combustion chamber structure as defined in claim 12, wherein said deflecting member comprises a frusto-conical annulus secured at its smaller end to the mixing head adjacent to the perimeter of said discharge throat and having a plurality of circumferentially spaced airstream-forming flutes.

14. Combustion chamber structure as defined in claim 13, in which the effective area of said flutes progressively decreases toward said discharge throat to proportionately increase the velocity of the air streams.

GRANT B. HODGSON.

References Cited in the file of this patent

UNITED STATES PATENTS

| Number | Name | Date |
|---|---|---|
| 1,342,901 | Good | June 8, 1920 |
| 2,143,259 | Clarkson | Jan. 10, 1939 |
| 2,420,135 | Henning | May 6, 1946 |
| 2,483,737 | Parish | Oct. 4, 1949 |
| 2,530,019 | Mayers | Nov. 14, 1950 |
| 2,541,170 | Mayers | Feb. 13, 1951 |
| 2,552,492 | Nathan | May 8, 1951 |
| 2,553,091 | Horning | May 15, 1951 |
| 2,560,207 | Berggren | July 10, 1951 |
| 2,560,223 | Hanzalek | July 10, 1951 |
| 2,604,510 | Berkey | July 22, 1952 |